No. 721,583. PATENTED FEB. 24, 1903.
D. LUBIN.
AGRICULTURAL MACHINE.
APPLICATION FILED AUG. 5, 1902.
NO MODEL. 5 SHEETS—SHEET 1.

WITNESSES:
INVENTOR
David Lubin
BY
ATTORNEYS.

No. 721,583. PATENTED FEB. 24, 1903.
D. LUBIN.
AGRICULTURAL MACHINE.
APPLICATION FILED AUG. 5, 1902.
NO MODEL. 5 SHEETS—SHEET 2.

WITNESSES: INVENTOR
David Lubin
BY
ATTORNEYS.

No. 721,583. PATENTED FEB. 24, 1903.
D. LUBIN.
AGRICULTURAL MACHINE.
APPLICATION FILED AUG. 5, 1902.
NO MODEL. 5 SHEETS—SHEET 3.

WITNESSES: INVENTOR
David Lubin
BY
ATTORNEYS.

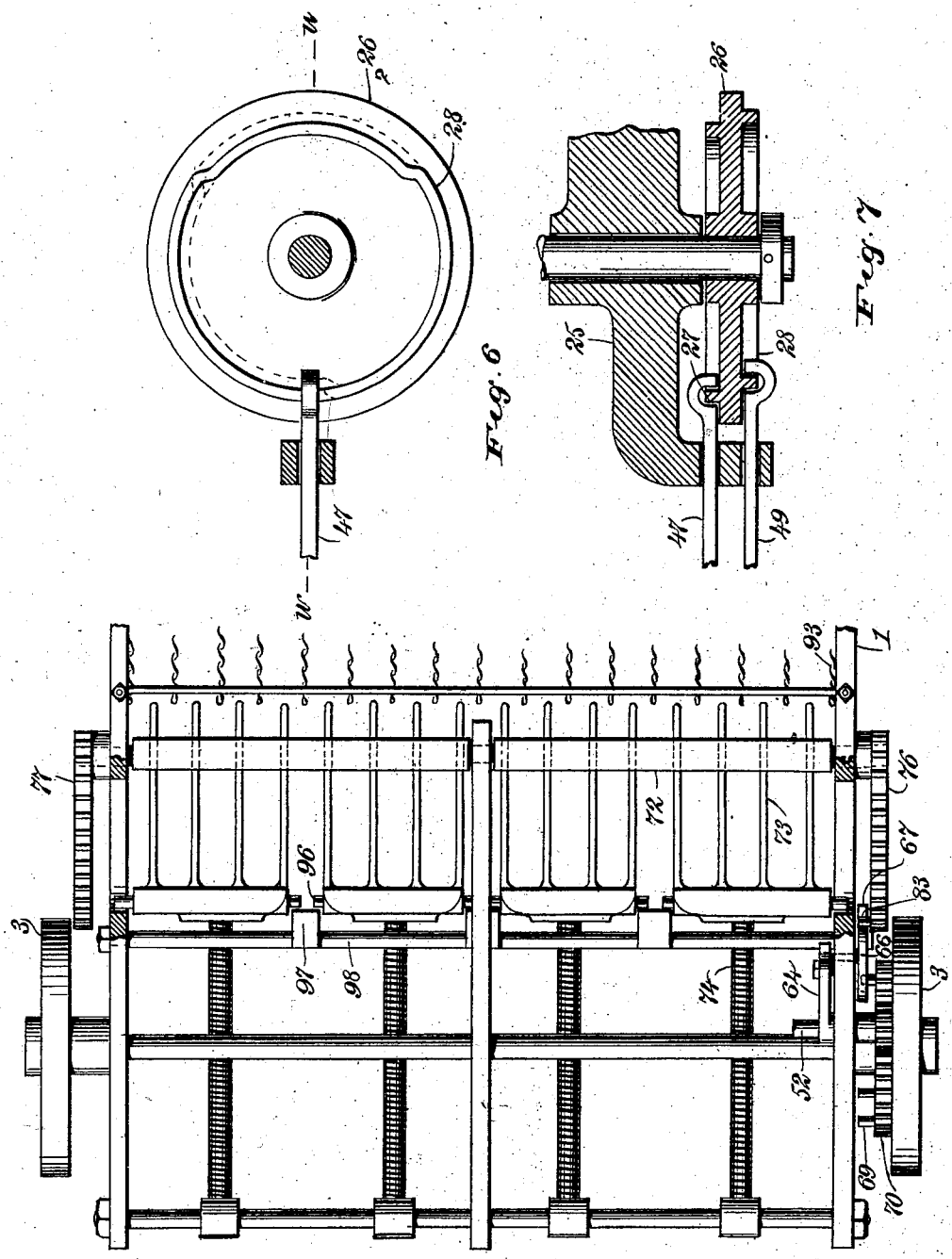

No. 721,583. PATENTED FEB. 24, 1903.
D. LUBIN.
AGRICULTURAL MACHINE.
APPLICATION FILED AUG. 5, 1902.
NO MODEL. 5 SHEETS—SHEET 5.
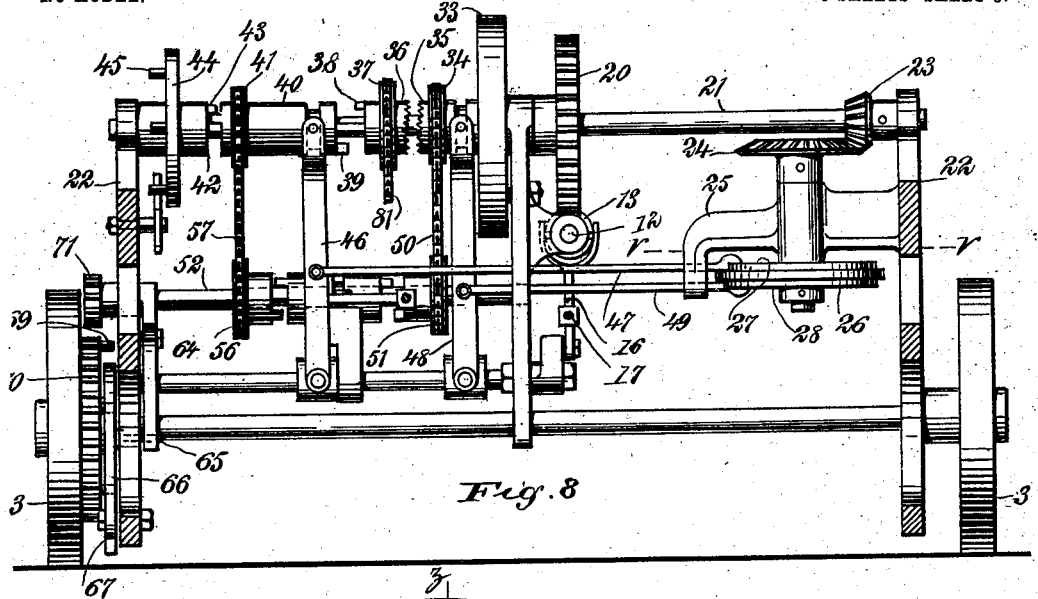
WITNESSES: INVENTOR
David Lubin
BY
ATTORNEYS.

ated February 24, 1903.

UNITED STATES PATENT OFFICE.

DAVID LUBIN, OF NEW YORK, N. Y.

AGRICULTURAL MACHINE.

SPECIFICATION forming part of Letters Patent No. 721,583, dated February 24, 1903.

Application filed August 5, 1902. Serial No. 118,470. (No model.)

*To all whom it may concern:*

Be it known that I, DAVID LUBIN, a citizen of the United States, and a resident of the city of New York, borough of Manhattan, in the county and State of New York, have invented a new and Improved Agricultural Machine, of which the following is a full, clear, and exact description.

This invention relates to improvements in agricultural machines of the class in which a motor mounted on a wheeled vehicle alternately operates a ground digging or breaking tool and moves the vehicle a short distance for the next operation of the tool, the object being to provide a machine of this character so constructed as to automatically change the gear connections to cause the different operations or movements.

I will describe an agricultural machine embodying my invention and then point out the novel features in the appended claims.

Reference is to be had to the accompanying drawings, forming a part of this specification, in which similar characters of reference indicate corresponding parts in all the figures.

Figure 1:
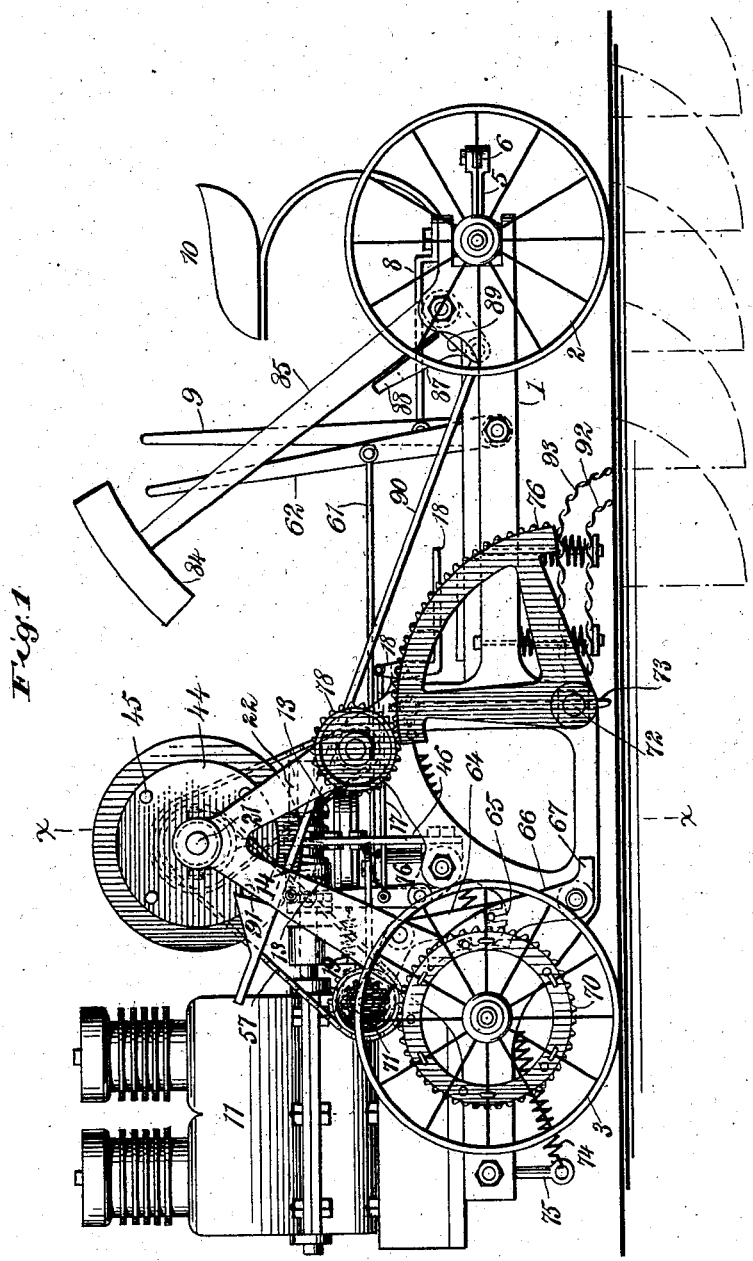
Figure 2:
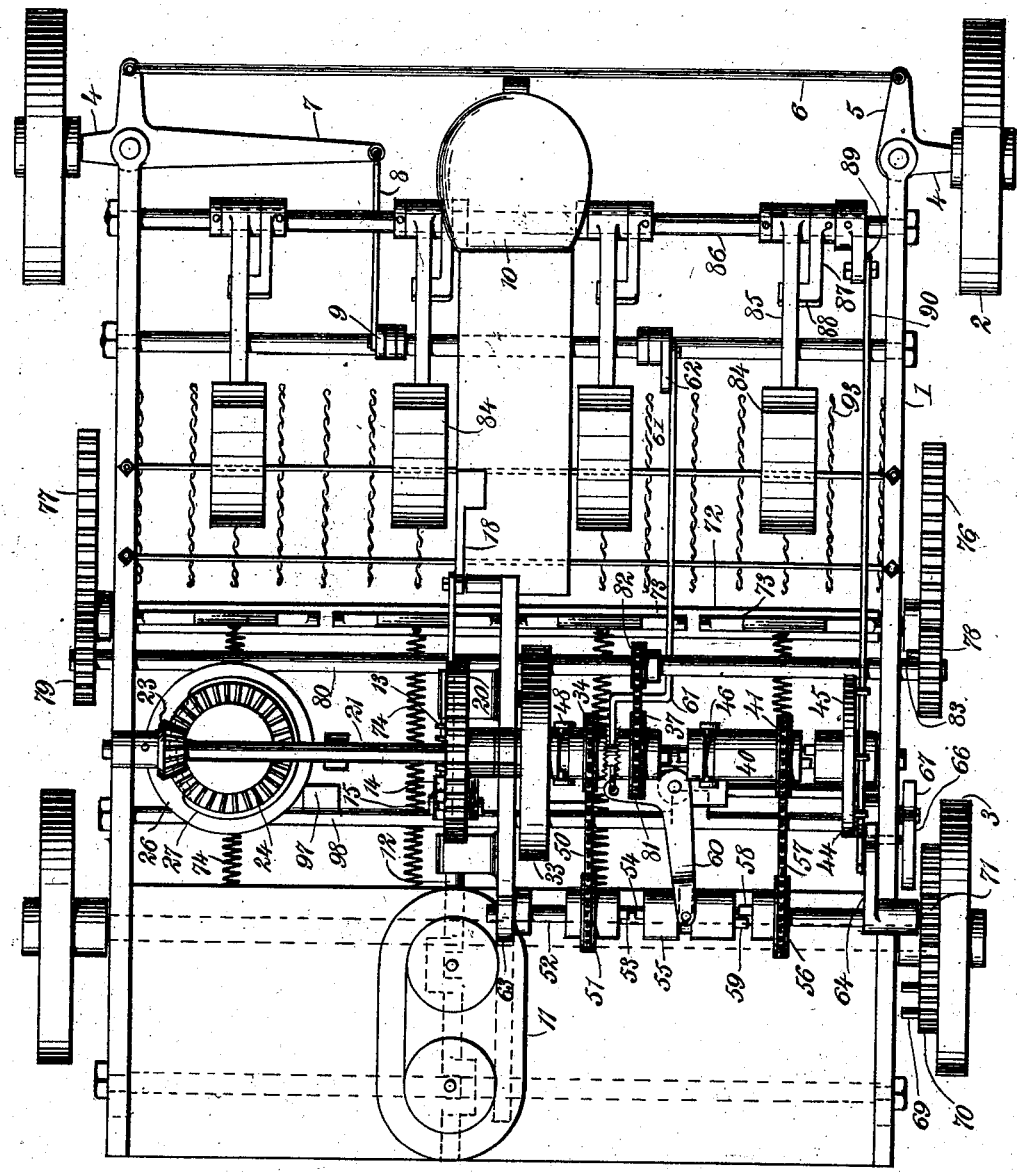
Figure 3:
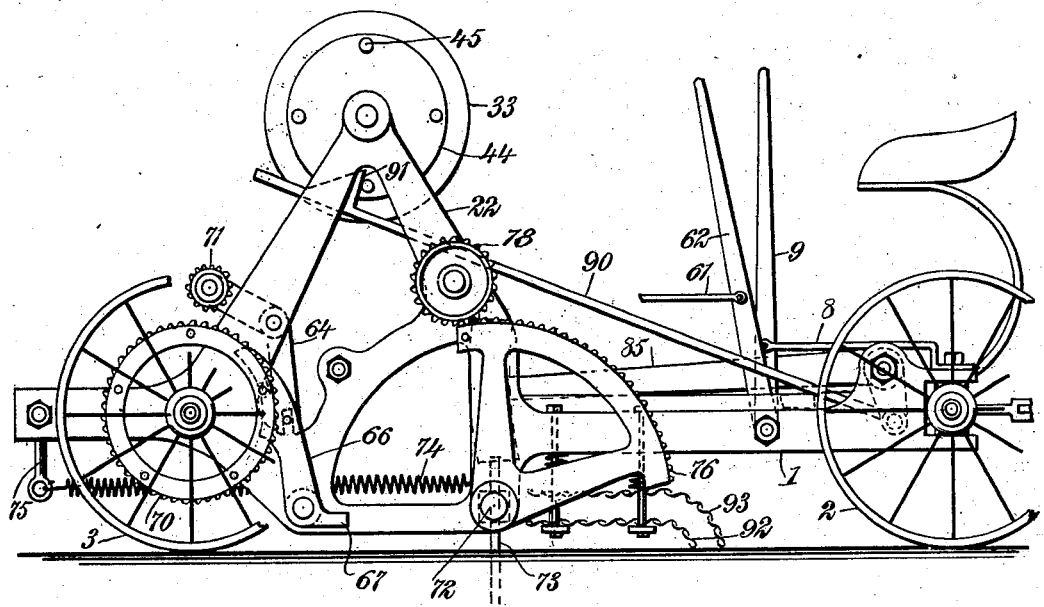
Figure 4:
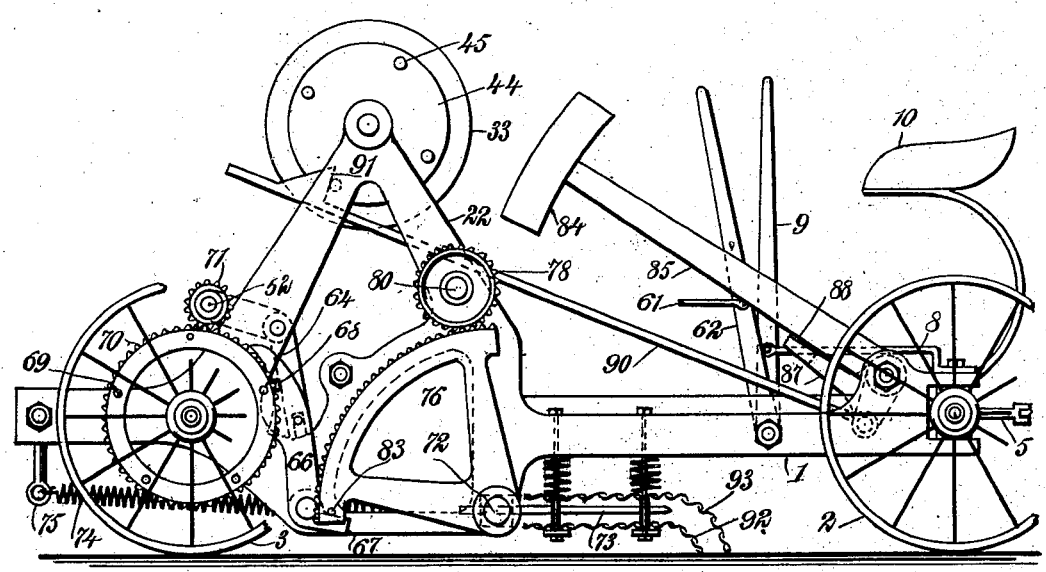

Figure 1 is a side elevation of an agricultural machine embodying my invention. Fig. 2 is a plan view thereof. Figs. 3 and 4 are side elevations showing parts in different positions. Fig. 5 is a detail plan showing the digging-tool in elevated position. Fig. 6 is a section on the line *v v* of Fig. 8. Fig. 7 is a section on the line *w w* of Fig. 6. Fig. 8 is a section on the line *x x* of Fig. 1. Fig. 9 is a section on the line *y y* of Fig. 10. Fig. 10 is a section on the line *z z* of Fig. 9, and Fig. 11 is a detail showing a modification in the hammer-operating mechanism.

Referring to the drawings, 1 designates the frame of the machine mounted on the rear wheels 2 and front wheels 3. The rear wheels 2 are designed for steering the vehicle, and therefore they are mounted on spindles 4, which have rearwardly-extended arms 5, connected by a rod 6. One of the spindles has an inwardly-extended arm 7, from which a draw-rod 8 extends to a shifting-lever 9 within reach of the driver or attendant on the seat 10.

Mounted on the forward portion of the vehicle is the motor 11, which may be a gas, gasolene, or like engine.

Loosely mounted on the driving-shaft 12 is a worm 13, and on this worm is a clutch-section 14, designed to be engaged with a clutch-section 15, movable on the driving-shaft 12, but designed to rotate therewith. This clutch-section 15 has an annular channel, in which the arms of a shifting-lever 16 engage, the said lever being clearly shown in Fig. 8, and from this shifting-lever a rod 17 extends rearward and is connected to an angle-lever 18, on the horizontally-disposed portion of which the operator or driver is designed to place his foot to force the clutch-section 15 into engagement with the clutch-section 14 when the machine is in operation. When the machine is not in operation, upon releasing the lever 18 a spring 19 will move the clutch-section 15 out of engagement with the clutch-section 14. The worm 13 meshes with a worm-wheel 20, connected to a driving-shaft 21, having bearings in uprights 22 on the frame. Mounted on one end of this shaft 21 is a bevel-pinion 23, engaging with a bevel-wheel 24 on a vertical shaft, having a bearing in a bracket 25, extending from one of the uprights 22, and on the lower end of this vertical shaft is a wheel 26, having a cam 27 on its upper surface and a cam 28 on its lower surface, the object of these cams being hereinafter fully described.

Attached to the shaft 21 is a gear-wheel 29, which meshes with a pinion 30, mounted to rotate on a stud 31, extended from a standard 32, and this pinion 30 meshes with the interior gears or teeth of a crown-wheel 33, loosely mounted on said shaft 21. On the hub of this wheel 33 is a sprocket-wheel 34, and on one side of this sprocket-wheel is a clutch member 35, designed to engage with a clutch member 36 on one side of a sprocket-wheel 37, loosely mounted on the shaft 21, and on the opposite side of this sprocket-wheel 37 is a clutch member 38, designed to be engaged by a clutch member 39 on a sleeve 40, movable lengthwise of the shaft 21, but having a splined connection therewith, so as to rotate with the shaft. On this sleeve 40 is a sprocket-wheel 41, and on the outer end of the sleeve is a clutch member 42 for engaging with a clutch member 43 on a disk 44, which on its outer side has a series of outwardly-extended pins 45. A swinging lever 46 has pins at its upper bifurcated end engaging in a channel formed in the sleeve 40, and from this lever a shifting-rod 47 extends and engages with the cam 27, as clearly shown in Fig. 6. Another swinging lever 48 has pins at its upper bifurcated end extended into a channel formed in the hub of the wheel 33, and from this lever 48 a shifting-rod 49 extends to a connection with the cam 28. By the connections between the wheel 33 and the shaft 21 it is obvious that the said wheel 33 will rotate in an opposite direction from that of the shaft, the purpose of which will hereinafter appear.

From the sprocket-wheel 34 a chain 50 extends to a connection with a sprocket-wheel 51, loosely mounted on a shaft 52 and having a clutch member 53 for engaging with a clutch member 54 on a sleeve 55, designed to slide on the shaft 52, but to rotate therewith. Also loosely mounted on the shaft 52 is a sprocket-wheel 56, from which a chain 57 extends to a wheel 41. This sprocket-wheel 56 has a clutch member 58 for engaging with a clutch member 59 on the sleeve 55. An angle-lever 60 has pins connected to its bifurcated end, which engage in an annular channel formed in the sleeve 55, and from the other member of this angle-lever a shifting-rod 61 extends rearward and connects with a lever 62 within easy reach of the person on the seat 10.

The inner end of the shaft 52 has a loose bearing in an upright 63, so that it may have a slight vertical swing at its outer end. Said outer end has a bearing in a lever 64, which is pivoted to one of the uprights of the main frame, and the downwardly-disposed portion of this lever 64 is slotted or notched to receive a pin 65 on a lever 66, pivoted to the main frame. The lower end of this lever 66 has a forward projection 67, and the upper end, which is extended above the pin 65 a considerable distance, is provided with a notch 68, designed to receive any one of a series of pins 69, extended inward from a gear-wheel 70, attached to a front wheel 3. This gear-wheel 70 is designed when the carriage is to be moved to be engaged by a pinion 71, mounted on the outer end of the shaft 52.

A rock-shaft 72 is mounted in the main frame, and carried by this rock-shaft and mounted to slide therein is a series of digging-tools, here shown as forms 73. The tops or cross-bars of the digging-tools are connected by means of springs 74 with rods 75, extended downward from the forward portion of the frame. These springs are for moving the digging-tools to normal position in the rock-shaft, as will be hereinafter described. On the outer ends of the rock-shaft are segment-gears 76 77, and these segment-gears are engaged by pinions 78 79 on a shaft 80, driven from the sprocket-wheel 37 through the medium of a chain 81, engaging with a sprocket-pinion 82 on said shaft. The segment-gear 76 carries a pin 83 on its inner side for engaging with a projection 67 on the lever 66.

In this machine while the vehicle is at a standstill it is designed that the several digging-tools shall be forced into the ground and then have a swinging motion to lift the loads of dirt and then be withdrawn by means of the springs to their normal position in the rock-shaft, after which the rock-shaft is moved to return the digging devices to vertical position for the next operation.

As a means for driving the digging-tools into the ground I employ a hammer 84 for each tool. These hammers are mounted on arms 85, and the arms are loosely mounted on a rock-shaft 86. On this rock-shaft 86 are rigidly connected arms 87, from which fingers 88 extend underneath the arms or handles of the hammers. The object of thus connecting the hammers with the shaft is to provide for the operation of the digging-tools—that is, should one of the digging-tools strike a stone or other obstruction, while its hammer will be swung upward by a movement of the rock-shaft and will fall by gravity, it will not operate to retard the movements of the other driving-hammers in their operation against their respective tools. From a crank-arm 89, secured to the shaft 86, a rod 90 extends forward, and on its forward end it has an upwardly-extended shoulder portion 91, designed to be engaged by any one of the pins 45 on the wheel 44.

Arranged in a suitable vertically-yielding frame forward of the rock-shaft 72 are two series of breaking-tines 92 93. These breaking-tines are twisted spirally, and their rear ends extend downward, so as to engage with the earth and rake or level the same. In the upward movement of the digging-tools the earth is carried between these breaking-tines and thoroughly broken or pulverized.

In Fig. 11 I have shown another means for operating the hammers. In this modification springs 94, connected at one end to the hammer-handles and at the other end to the frame of the machine or to a cross-bar thereof, serve to move the hammers downward and also to hold them in engagement, and the hammers are moved upward by means of cam-fingers 95, mounted on a rotary shaft. Each hammer-handle is operated upon in this device three times on each complete rotation of the shaft carrying the cams—that is, there are three cams for each hammer.

In the operation of the device when the vehicle is at a standstill and of course the shaft 21 rotating the cam 27 will shift the sleeve 40 into clutch connection with the wheel 44. The pins 45, by engaging one after the other with the shoulder 91 of the rod 90, will cause the rock-shaft 86 to move the several hammers upward. When a pin releases the shoulder 91 or passes out of engagement therewith, the rock-shaft will be returned by the weight of the hammers moving downward to strike the digging-tools. Three blows will probably be all that is necessary to drive the tool into the ground; but by increasing the number of pins 45 it is obvious that the number of blows may be increased. Now the tools driven into the ground are to be swung upward with their loads. The cam 27 now shifts the sleeve 40 to engage its clutch 39 with the clutch 38 of the sprocket 37. As this sprocket 37 now rotates it will cause a rotation of the shaft 80, and consequently rotate the pinions 78 and 79, which will cause the segment-gears 76 and 77 to be moved rearward to the position indicated in Fig. 4. On the extreme movement of said segment-gears and the lifting of the digging-tools to the position indicated in Fig. 4 the pin 83 will engage with the projection 67 of the lever 66, rocking the said lever out of engagement with a pin 69 and also rocking the lever 64 to move the pinion 71 into engagement with the gear 70. Now the cam 27 will move the sleeve 40 to neutral position, and the cam 28 will shift the lever 48 to move the clutch member 35, carried by the wheel 33, into engagement with the clutch member of the sprocket 37. As this wheel 33 rotates in an opposite direction from that of the shaft, as before mentioned, it is obvious that a reverse motion will be imparted to the shaft 80, which will move the tools to vertical position. Before this movement, however, or as soon as the digging-tools have discharged their loads the springs 74 will draw the tools rearward to the position indicated in Fig. 5—that is, to their normal position with relation to the rock-shaft. The rearward motion will be limited by means of lugs 96 on the ends of the head portions or cross-bars of the tools engaging with stops 97 on a cross-bar 98 of the machine-frame. While the pinion 71 is in engagement with the gear 70 and the clutch member 59 held in engagement with the clutch member 58 it is obvious that the vehicle will be moved forward a short distance. Then the operation of digging will be repeated. When the vehicle is to be moved backward, the clutch member 54 will be moved into engagement with the clutch member 53, so that the wheel 33 will cause the reverse movement of the pinion 71.

It will be seen that all the movements and operations of this machine are automatic— that is, controlled directly from the motor— excepting the shifting of the sleeve 55; but when the machine is operating in a field this sleeve is to be held in engagement with the sprocket-wheel 56 continuously. When the machine comes to a stop for the next operation of the digging-tool, the pinions 71 will have then moved upward out of engagement with the gear 70 by the weighted upper end of the lever 66.

Having thus described my invention, I claim as new and desire to secure by Letters Patent—

1. An agricultural machine comprising a wheeled vehicle, a motor mounted on the vehicle, a digging-tool mounted on the vehicle, driving connections between the motor and vehicle, driving connections between the motor and digging-tool, and means for automatically changing the driving power of the motor between the vehicle and the digging-tool, substantially as specified.

2. An agricultural machine comprising a wheeled vehicle, a motor carried thereon, a rock-shaft, digging-tools carried by said rock-shaft and mounted to slide therein, means operated by the motor for rocking said rock-shaft, and hammers controlled by the motor for driving the tools into the ground, substantially as specified.

3. An agricultural machine comprising a wheeled vehicle, a motor thereon, a rock-shaft mounted in the frame of the vehicle, segment-gears on said rock-shaft and operated from the motor, digging-tools carried by said rock-shaft and movable through the same, and means controlled by the motor for forcing the tools into the ground, substantially as specified.

4. An agricultural machine comprising a wheeled vehicle, a motor thereon, a rock-shaft, segment-gears on said rock-shaft, digging-tools consisting of tines carried by the rock-shaft and movable therethrough, gear connections between said segment-gears and the motor, gear connections between the motor and vehicle, a rock-shaft at the rear portion of the vehicle-frame, hammers loosely mounted on said rock-shaft, and means operated by the motor for operating said rock-shaft, substantially as specified.

5. In an agricultural machine, a wheeled vehicle, a motor thereon, means operated by the motor for moving the vehicle, a rock-shaft operated by the motor, digging-tools carried by said rock-shaft and movable lengthwise therein, spiral breaking-tines forward of the rock-shaft, and means controlled by the motor for forcing the digging-tools into the ground, substantially as specified.

6. An agricultural machine comprising a wheeled vehicle, a motor thereon, a rock-shaft, a series of digging-tools independently mounted in the rock-shaft and movable therein, means controlled by the motor for rocking the rock-shaft, another rock-shaft, hammers loosely mounted on said other rock-shaft for striking the upper portions of the digging-tools, and means operated by the motor for causing a plurality of striking movements of the hammers, substantially as specified.

7. An agricultural machine comprising a wheeled vehicle, a motor thereon, a rock-shaft mounted in the frame of the vehicle, digging-tools carried by the rock-shaft and movable therein, springs connected to the digging-tools for moving them in one direction, hammers controlled by the motor for forcing the digging-tools into the ground, means controlled by the motor for rocking the rock-shaft, and means for placing the motor in driving connection with the vehicle, substantially as specified.

8. An agricultural machine comprising a wheeled vehicle, a motor thereon, a main driving-shaft having worm connection with the motor, a vertically-swinging shaft, means for placing the same in driving connection with the main shaft, a pinion on said vertically-movable shaft, a gear on one of the wheels of the vehicle in which said pinion is designed to engage, a rock-shaft, digging-tools carried by the rock-shaft, segment-gears on said rock-shaft, pinions engaging with said segment-gears and driven from the first-named shaft, means for automatically placing the shaft and pinions in operative connection, and means for automatically moving the pinion on the vertically-movable shaft into engagement with the gear on the vehicle-wheel, substantially as specified.

9. In an agricultural machine, a wheeled vehicle, a motor thereon, a rock-shaft mounted in the frame of the vehicle, digging-tools carried by said rock-shaft and movable with relation thereto, another rock-shaft, hammers carried by said other rock-shaft, a main driving-shaft operated from the motor, a wheel mounted loosely on said main driving-shaft, means for placing said wheel in driving connection with the shaft, pins extended outward from said wheel, an arm extended from said other rock-shaft, and a rod extended from said arm and having a shoulder portion for engaging with any one of said pins, substantially as specified.

10. An agricultural machine comprising a wheeled vehicle, a motor thereon, a rock-shaft, digging-tools carried by the rock-shaft and movable therein, means controlled by the motor for forcing the tools into the ground, segment-gears on said rock-shaft, means operated by the motor for moving said segment-gears alternately in opposite directions, a gear-wheel on one of the vehicle-wheels, a pinion for engaging with said gear-wheel, a vertically-swinging shaft on which said pinion is mounted, and means operated from the motor for rotating said shaft, substantially as specified.

11. An agricultural machine comprising a wheeled vehicle, a motor mounted thereon, a rock-shaft, digging-tools carried by the rock-shaft and movable therein, segment-gears on said rock-shaft, pinions operated by the motor and engaging with said segment-gears, a gear-wheel connected to one of the wheels of the vehicle, a vertically-movable pinion for engaging with said gear-wheel, means operated by the motor for driving said pinion, and means operated by one of the segment-gears for moving said pinion into engagement with the gear on the vehicle-wheel, substantially as specified.

In testimony whereof I have signed my name to this specification in the presence of two subscribing witnesses.

DAVID LUBIN.

Witnesses:
D. L. WEEKS,
CHARLES L. WEEKS.